Dec. 15, 1964      N. F. LARSSON      3,161,447
THRUST BEARING FOR ROTATABLE SHAFT
Filed May 29, 1963

INVENTOR.
Nils Folke Larsson
BY
ATTORNEY.

United States Patent Office 3,161,447
Patented Dec. 15, 1964

3,161,447
THRUST BEARING FOR ROTATABLE SHAFT
Nils Folke Larsson, Mariehall, Sweden, assignor to Aktiebolaget Electrolux, Stockholm, Sweden, a corporation of Sweden
Filed May 29, 1963, Ser. No. 284,059
Claims priority, application Sweden, June 8, 1962
7 Claims. (Cl. 308—163)

This invention relates generally to bearings for rotated shafts, and more particularly is directed to thrust bearings for preventing axial shifting of rotated shafts, for example, of electric motors or the like, especially when such shafts are axially loaded.

It is an object of this invention to provide a bearing arrangement for a rotated shaft, which arrangement is capable of absorbing axially applied loads and further is adjustable to eliminate any axial play in the mounting of the rotated shaft.

A further object is to provide a bearing arrangement for a rotated shaft which acts as a thrust bearing to absorb axial loads and which is automatically adjusted to take up any axial play that may occur in the mounting of the shaft so that, when the bearings for supporting the shaft are in an inaccessible location, for example, as in the case of the shaft of an electric motor used for driving components of a business machine, such as, an electric typewriter, calculating machine or cash register, axial play occurring by reason of wearing of the thrust bearing surfaces under axial loads, will not affect the safety or reliability of operation of the machine.

In accordance with an aspect of this invention, a bearing arrangement for the play-free, axial support of a rotated shaft includes a bearing member at least at one end of the shaft and having a planar thrust bearing surface extending normal to the axis of the shaft and engageable with the adjacent end of the latter, the bearing member being supported for movement relative to the shaft along a path that includes an obtuse angle with the axis of the shaft so that movement of the bearing member along the path in one directon displaces the thrust bearing surface toward the adjacent end of the shaft to take up any axial play in the mounting for the shaft. The obtuse angle included between the path of movement of the bearing member and the axis of the rotated shaft is selected so that an axial load applied to the shaft in the direction toward the thrust bearing surface cannot shift the bearing member along its path of movement in the direction displacing the thrust bearing surface away from the adjacent end of the shaft.

In accordance with a further feature of the invention, the bearing member, which is preferably in the form of a pin having the thrust bearing surface obliquely formed thereon, is slidable in the bore of a sleeve having its axis defining the path of movement of the bearing member, and a compression spring is disposed in such bore between the slidable pin and an adjustable set screw so that the spring exerts an adjustably determined force against the pin for moving the thrust bearing surface against the adjacent end of the shaft, thereby to automatically take up any axial play in the mounting of the latter.

The above, and other objects, features and advantages of the invention, will be apparent in the following detailed description of an illustrative embodiment thereof which is to be read in connection with the accompanying drawing forming a part hereof, and wherein.

Figure 1:
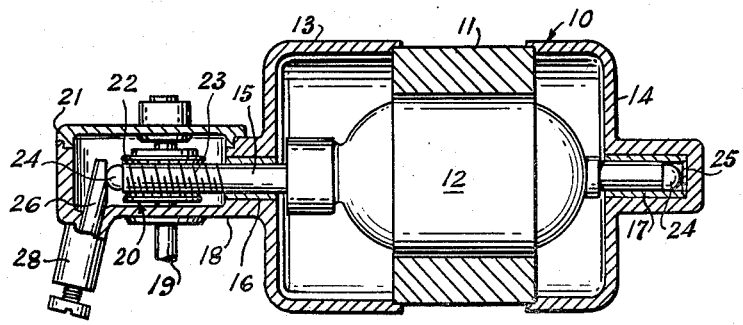
FIG. 1 is an axial sectional view of an electric motor associated with reduction gearing, and having its shaft rotatably supported by a bearing arrangement embodying this invention.

Referring to the drawing in detail, and initially to FIG. 1 thereof, it will be seen that the present invention is there shown applied to an electric motor 10 that generally includes a stator 11 and a rotor 12 carried by a shaft 15 which is radially supported, at opposite sides of the rotor, in bearing bushings or sleeves 16 and 17 mounted in the opposite end walls 13 and 14, respectively, which combine with the stator 11 to form the motor housing. The end portion of shaft 15 that is radially supported in bushing 16 extends axially beyond end wall 13 into a reduction gear housing 18 that is preferably integral with end wall 13.

The gear housing 18 contains reduction gearing 20 and is closed by a lid 21. The reduction gearing 20 consists of a worm wheel 22 which is carried by a shaft 19 suitably journalled in housing 18 and lid 21 and meshing with a worm 23 which is formed on the end portion of shaft 15 within housing 18. It will be apparent that, when motor 10 is operated, the meshing engagement of worm 23 with worm wheel 22 for effecting rotation of shaft 19 from the motor shaft 15 at a reduced rotational speed results in an axial thrust on the shaft 15.

Figure 3:
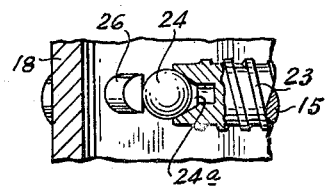
FIG. 3 is a fragmentary top plan view of the thrust bearing of FIG. 2.

In the illustrated embodiment of the invention, the axial or thrust bearings for absorbing such axial load on the shaft 15 include bearing balls 24 received in generally conical sockets 24a (FIG. 3) at the opposite ends of motor shaft 15. The ball 24 at the end of shaft 15 radially supported in bearing bushing 17 engages against a fixed end wall 25 of the bearing bushing 17 to limit axial movement of shaft 15 toward the right, as viewed on FIG. 1.

Figure 2:
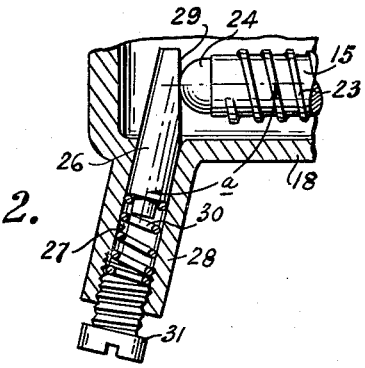
FIG. 2 is an enlarged, fragmentary sectional view of the portion of the structure shown in FIG. 1 which includes the automatically adjustable thrust bearing in accordance with the invention.

In accordance with this invention, the thrust bearing for the end of shaft 15 extending into gear housing 18 includes a bearing member 26, preferably in the form of a pin, as shown. The pin 26 is axially movable within a bore 27 defined by a sleeve 28 projecting from gear housing 18 and preferably formed integrally with the latter. The axis of bore 27, and hence the path of the axial movement of pin 26, includes an obtuse angle $a$ (FIG. 2) with respect to the axis of motor shaft 15. Further, the pin 26 is intended to project from bore 27 into the interior of casing 18, and the projecting portion of pin 26 is provided with a planar thrust bearing surface 29 arranged obliquely with respect to the axis of pin 26 so that the plane of the surface 29 will extend normal or perpendicular to the axis of shaft 25. When pin 26 is moved upwardly in bore 27, surface 29 is displaced toward the adjacent end of shaft 15, that is, toward the right as viewed on FIGS. 1 and 2, and thereby engages the bearing ball 24 seated in the adjacent end of the motor shaft. A helical compression spring 30 is disposed in the bore 27 of sleeve 28 and engages, at its upper end, against pin 26, and a set screw 31 is adjustably threaded into bore 27 to provide an adjustable abutment for the lower end of spring 30. Thus, the spring 30 urges pin 26 in the upward direction, that is, in the direction for pressing thrust bearing surface 29 against the adjacent bearing ball 24. Adjustment of the screw 31 makes it possible to vary the pressure of the thrust bearing surface 29 against the adjacent ball 24.

The obtuse angle $a$ is selected so that an axial load applied by the shaft 15 against the thrust bearing surface 29 will not effect downward movement of pin 26 in bore 27. Thus, an axial force applied by shaft 15 toward the left, as viewed on FIG. 2, against bearing surface 29 results in two components or vectors, one vector of the force urging the pin 26 laterally against the surface of bore 27, and thus resulting in frictional resistance to movement of pin 26 in bore 27, while the other vector of the force tends to move the pin 26 downwardly against the force of spring 30. By suitably selecting the angle $a$, it may be ensured that the force vector giving rise to frictional resistance to movement of the pin will always be sufficiently large to overcome the force vector tending to displace the pin in the direction of its axis.

It will be apparent that, with the described bearing arrangement embodying this invention, any wear of the thrust bearing surfaces, for example, of the bearing balls 24, the end wall 25, or the bearing surface 29 of pin 26, which would normally result in axial play of the shaft 15, is immediately compensated by movement of the pin 26 under the influence of spring 30 so as to always maintain play-free axial support of the motor shaft, thereby avoiding any possible damage to the motor or to the reduction gearing 20. Thus, the motor 10 and its reduction gearing 20 can be mounted in an inaccessible location, for example, in the interior of a business machine, such as, an electric typewriter, calculating machine or cash register, without the fear that developing axial play in the bearings supporting the motor shaft, which condition cannot be checked by reason of the inaccessibility of the motor, will affect either the safety or reliability of operation of the machine.

Although the pin 26 of the illustrated embodiment has circular cross-sections, and thus is turnable in the bore 27, such turning is resisted by the engagement of bearing ball 24 at the center of the thrust bearing surface 29 urged thereagainst by the action of spring 30. However, if desired, the pin 26 may be made axially slidable, but non-turnable in bore 27, for example, by providing the pin 26 and bore 27 with a cooperating key and guideway, or with complementary non-circular cross-sections.

Although an illustrative embodiment of this invention has been described in detail herein with reference to the drawing, it is to be noted that the invention is not limited to that precise embodiment, and that various changes and modifications may be effected therein by one skilled in the art without departing from the scope or spirit of the invention as defined in the appended claims.

In the preferred embodiment shown in the drawing the axis of the bore 27 forms an angle $a$ of about 104 degrees with the axis of the motor shaft 15.

I claim:

1. A device for the play-free, axial support of a rotated shaft, comprising a shaft, a bearing member at least at one end of said shaft and having a planar bearing surface extending normal to the axis of said shaft and engageable with said one end of the shaft, and means supporting said bearing member for movement relative to said shaft along a path that includes an obtuse angle with said axis of the shaft so that movement of said bearing member along said path in one direction displaces said bearing surface toward said one end of the shaft, said obtuse angle being selected to prevent movement of said bearing member along said path in the opposite direction by axial loads applied by said one end of the shaft against said bearing surface.

2. A device as in claim 1; further comprising means urging said bearing member in said one direction so that said bearing surface exerts an axial pressure against said one end of the shaft.

3. A device as in claim 1; wherein said bearing member is in the form of a pin having said bearing surface formed thereon obliquely with respect to the axis of said pin, and said means supporting the bearing member is in the form of a sleeve defining a bore in which said pin is slidable, with the axis of said bore being disposed at said obtuse angle with respect to said axis of the shaft.

4. A device as in claim 3; further comprising a spring in said bore acting on said pin to urge the latter axially in said one direction so that said bearing surface exerts an axial pressure against said one end of the shaft.

5. A device as in claim 4; wherein said spring is a compression spring engaging at one end with said pin; and further comprising a screw threaded in said bore and engaging the other end of said spring for adjusting the force exerted by the latter on said pin.

6. A device for supporting a rotated shaft comprising a shaft, sleeve bearings rotatably receiving said shaft at locations spaced apart along the latter to radially support the shaft, thrust bearing means at one end of said shaft to limit axial displacement of the shaft in the direction toward said one end, a bearing pin arranged adjacent the other end of said shaft with the axis of said pin including an obtuse angle with the axis of the shaft, said bearing pin having an oblique bearing surface normal to said axis of the shaft and engageable by said other end of the shaft, means slidably supporting the bearing pin for movement parallel to said axis of the pin so that, movement of said pin in one direction causes said bearing surface to act axially against said other end of the shaft for taking-up axial play, said obtuse angle being selected to prevent movement of said pin in the opposite direction by axial loads from the shaft.

7. A device as in claim 6; wherein said other end of the shaft carries a bearing ball riding on said bearing surface; and further comprising spring means urging said pin in said one direction to maintain contact of said bearing surface with said ball.

References Cited in the file of this patent

UNITED STATES PATENTS

| | | |
|---|---|---|
| 1,436,387 | Edelen | Nov. 2, 1922 |
| 1,508,824 | Schramm | Sept. 16, 1924 |
| 1,884,974 | Hurd | Oct. 25, 1932 |